United States Patent
Benner et al.

(10) Patent No.: US 11,325,208 B2
(45) Date of Patent: May 10, 2022

(54) LASER ACTIVATION

(71) Applicant: Continental Teves AG & Co. oHG, Frankfurt am Main (DE)

(72) Inventors: Marco Benner, Biedenkopf-Wallau (DE); Svenja Raukopf, Gemünden Felda-Hainbach (DE); Florian Häupl, Hungen (DE); Johannes Rosenberger, Frankfurt am Main (DE)

(73) Assignee: CONTINENTAL TEVES AG & CO. OHG, Frankfur am Main (DE)

( * ) Notice: Subject to any disclaimer, the term of this patent is extended or adjusted under 35 U.S.C. 154(b) by 0 days.

(21) Appl. No.: 16/720,759

(22) Filed: Dec. 19, 2019

(65) Prior Publication Data
US 2020/0198062 A1    Jun. 25, 2020

(30) Foreign Application Priority Data
Dec. 21, 2018    (DE) .................... 10 2018 222 795.0

(51) Int. Cl.
*B23K 26/352*    (2014.01)
*B29C 65/16*    (2006.01)
*B29C 65/00*    (2006.01)

(52) U.S. Cl.
CPC ............ *B23K 26/355* (2018.08); *B29C 65/16* (2013.01); *B29C 65/1629* (2013.01); *B29C 65/1632* (2013.01); *B29C 66/73921* (2013.01)

(58) Field of Classification Search
CPC .............. B23K 26/355; B23K 26/3584; B29C 37/0082; B29C 45/14311; B29C 2045/14868; B29C 65/16; B29C 66/73921
See application file for complete search history.

(56) References Cited

U.S. PATENT DOCUMENTS

| | | | |
|---|---|---|---|
| 8,216,501 | B2 | 7/2012 | Egerer et al. |
| 10,201,105 | B2 | 2/2019 | Meschke et al. |
| 10,347,554 | B2 | 7/2019 | Santos et al. |
| 10,395,947 | B2 | 8/2019 | Harada et al. |
| 2015/0011270 | A1 | 1/2015 | Tseng et al. |
| 2017/0271229 | A1* | 9/2017 | Santos ............... H01L 33/62 |
| 2018/0328692 | A1* | 11/2018 | Zimmer ............ B23K 26/3584 |
| 2019/0168340 | A1* | 6/2019 | Henrottin ........... B23K 26/3584 |

FOREIGN PATENT DOCUMENTS

| | | |
|---|---|---|
| CN | 102817018 A | 12/2012 |
| CN | 104283988 A | 1/2015 |
| CN | 104968483 A | 10/2015 |

(Continued)

OTHER PUBLICATIONS

Chinese Office Action for Chinese Application No. 201911307490.9, dated Jun. 2, 2021 with translation, 10 pages.

(Continued)

*Primary Examiner* — Philip C Tucker
*Assistant Examiner* — Jimmy R Smith, Jr.
(74) *Attorney, Agent, or Firm* — RatnerPrestia

(57) ABSTRACT

A method for roughening a surface of a body by a laser, the laser acting on the surface of a body and thereby creating recesses in the surface, and the laser thereby being directed and guided onto the surface and set in terms of its power output in such a way that recesses with at least two substantially different depths are created in the surface of the body.

13 Claims, 1 Drawing Sheet

(56) References Cited

FOREIGN PATENT DOCUMENTS

| | | | |
|---|---|---|---|
| CN | 106030770 | A | 10/2016 |
| CN | 107221515 | A | 9/2017 |
| EP | 1995034 | A2 | 11/2008 |
| EP | 2982599 | A1 | 2/2016 |
| FR | 2837135 | A1 | 9/2003 |
| JP | 2015063090 | A | 4/2015 |
| JP | 2016144823 | A | 8/2016 |
| WO | 2017191013 | A1 | 11/2017 |

OTHER PUBLICATIONS

German Examination Report for German Application No. 10 2019 220 190.3, dated Mar. 3, 2021, 5 pages.

\* cited by examiner

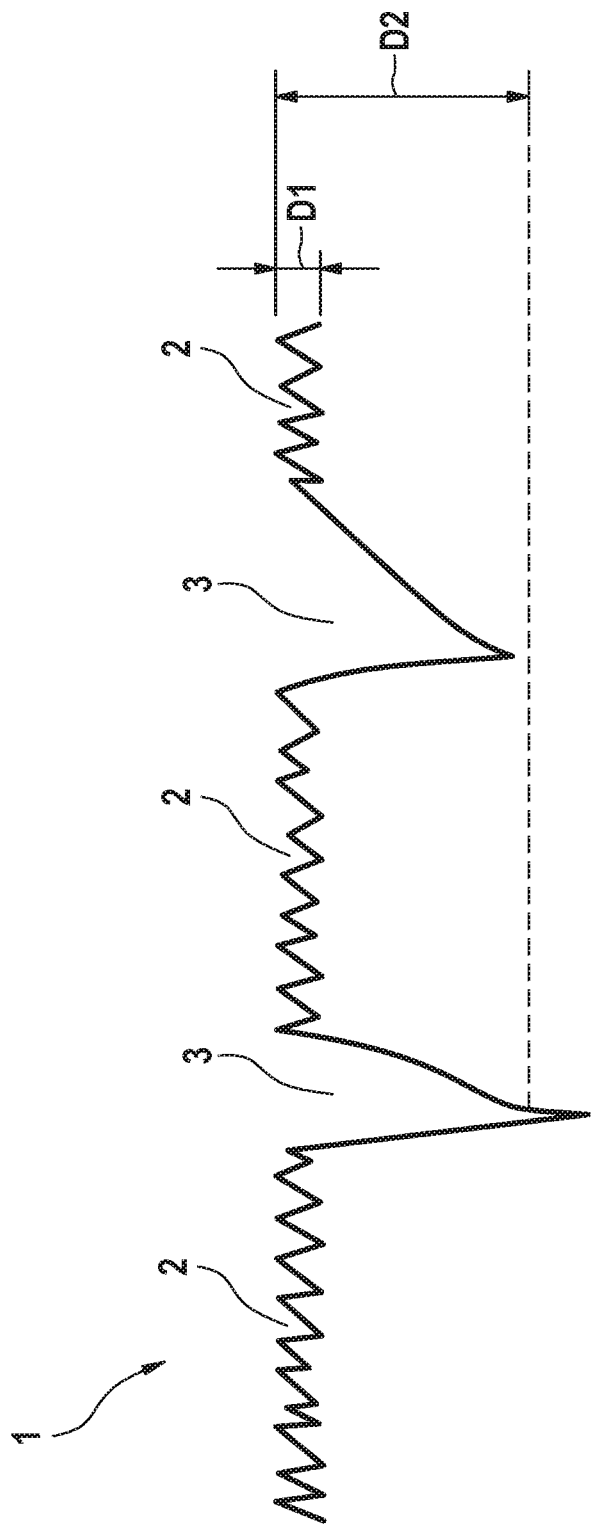

LASER ACTIVATION

CROSS REFERENCE TO RELATED APPLICATIONS

This application claims priority to German Patent Application No. 10 2018 222 795.0, filed Dec. 21, 2018, the contents of such application being incorporated by reference herein.

FIELD OF THE INVENTION

The invention relates to a method for roughening a surface of a body by means of a laser.

BACKGROUND OF THE INVENTION

Methods for roughening surfaces by means of a laser are known. They are used inter alia for improving the bonding between two plastic housing parts during injection-molding.

SUMMARY OF THE INVENTION

An aspect of the invention is a method that allows an improved bonding effect or seal-tightness between two plastic housings and/or is more effective than the methods according to the prior art and/or is less costly.

Recesses of substantially two different depths is preferably understood as meaning that recesses of a first type of recess and of a second type of recess, which differ, in particular significantly, by the depth of the recesses, are created.

Preferably, the laser is controlled in such a way that it activates the surface in the roughened region or the method also preferably comprises an activation, in particular implicit activation, of the surface of the body. In the course of the method, particularly preferably, the first and second recesses or the recesses of the first and second type of recess are created substantially in a focal region of the laser, whereby the laser produces a plasma from the surface material, which is in particular advantageous for better chemical bonding in an injection-molding process. When roughening the surface of plastic by means of the laser, most particularly preferably active, free radical carbons are produced.

Expediently, the surface of the body that is roughened according to the method by means of the laser is intended for encapsulation with a plastic or plastic housing.

The expression that the laser is controlled in such a way is preferably understood as meaning that the laser is directed onto the surface and guided and set with respect to its power output in such a way.

It is preferred that the material of the surface of the body is a plastic, in particular a thermoplastic or thermoset or an epoxy.

It is expedient that multiple or relatively many recesses, in particular more than one thousand or millions, are created and at the same time recesses of substantially two different types of recess are created, differing substantially from one another at least by their depth and each type of recess being characterized by a defined depth or a defined depth interval.

It is preferred that the laser is controlled in such a way that the creation of the first type of recess with a smaller depth prevails and is interrupted by, or there is a regular or sporadic alternation from/to, the creation of the second type of recess with a greater depth, the laser being controlled in such a way that in each case after a defined time, in particular provided with a defined inaccuracy, and/or after a defined distance of the surface covered by the laser, or on the basis of a defined random principle, recesses of the second type of recess are created in the surface between the recesses of the first type of recess.

Preferably, first the recesses of the first type of recess are created and then the laser creates the recesses of the second type of recess.

It is expedient that the laser is in this case directed and guided onto the surface in such a way that it substantially does not create any preferential direction and/or regular pattern of the recesses.

It is preferred that the depth of the second type of recess is at least 2 or 3 times, in particular 5 times or 10 times, as great/deep as the depth of the first type of recess.

Expediently, the laser is in this case directed and guided onto the surface and set in terms of its power output in such a way that it creates first recesses or recesses of the first type of recess of at least 50 µm in depth, in particular of at least 90 µm, and second recesses or recesses of the second type have particularly preferably a depth of substantially at least 200 µm and/or up to 300 µm.

It is expedient that the laser is controlled in such a way that the recesses, in particular of the first type of recess and of the second type of recess, substantially have a point-like and/or groove-like structure and in particular taper in the direction of deeper into the material.

Preferably, the material, at least on the surface, of the body comprises round and/or substantially spherical filler bodies or fillers. In particular, these filler bodies or fillers have a defined color, particularly preferably black or green or blue or red.

Preferably, the laser is in this case directed and guided onto the surface in such a way that it substantially does not create any preferential direction and/or regular pattern of the recesses.

Expediently, the laser is controlled and used within the method in a pulsed manner.

It is expedient that the method is applied to the surface of a first plastic housing of a speed sensor, in particular wheel speed sensor, this first plastic housing being at least partially encapsulated with plastic. Particularly preferably, the method is used for roughening a zone or a region which substantially encloses a zone left exposed by the encapsulation of the further housing, and this enclosing, roughing zone is included in the encapsulation, and consequently increased seal-tightness between the first housing and the further housing is ensured in spite of an exposed area.

BRIEF DESCRIPTION OF THE DRAWINGS

In the drawings, in a schematic illustration:
The FIGURE illustrates an aspect of the invention.

DETAILED DESCRIPTION OF THE PREFERRED EMBODIMENTS

The FIGURE shows an exemplary embodiment of the surface 1 of a body, where, by way of example, this surface has been roughened according to the method by means of the laser. Recesses of the first type of recess 2 and second type of recess 3 can be seen, wherein the recesses 2, 3 have no preferred direction. The recesses 2 of the first type of recess 2 have for example a depth D1 of 50 µm and the recesses of the second type of recess 3 have a depth D2 of 250 µm.

The invention claimed is:

1. A method for roughening a surface of a body by at least one laser, the laser acting on the surface of the body and creating recesses in the surface, and the laser being directed and guided onto the surface and set in terms of a power output of the laser in such a way that separated recesses with at least two substantially different depths are created in the surface of the body, each of the recesses surrounded by a periphery on the surface of the body, the at least two substantially different depths extending below the surface of the body.

2. The method as claimed in claim 1, wherein the laser is controlled in such a way that it activates the surface in a roughened region.

3. The method as claimed in claim 2, wherein a material of the surface of the body is a plastic.

4. The method as claimed in claim 1, wherein a material of the surface of the body is a plastic.

5. The method as claimed in claim 4, wherein the body plastic is selected from the group consisting of a thermoplastic, a thermoset, and an epoxy.

6. The method as claimed in claim 1, wherein multiple recesses are created and at the same time recesses of substantially two different types of recess are created, differing substantially from one another at least by their depth and each type of recess having a defined depth or a defined depth interval.

7. The method as claimed in claim 1, wherein the laser is controlled in such a way that the creation of a first type of recess with a smaller depth prevails, and is interrupted by the creation of a second type of recess with a greater depth, the laser being controlled in such a way that in each case after a defined time, and/or after a defined distance of the surface covered by the laser, or on the basis of a defined random principle, recesses of the second type of recess are created in the surface between the recesses of the first type of recess.

8. The method as claimed in claim 7, wherein first the recesses of the first type of recess are created and then the laser creates the recesses of the second type of recess.

9. The method as claimed in claim 7, wherein the depth of the second type of recess is at least 3 times as great/deep as the depth of the first type of recess.

10. The method as claimed in claim 7, wherein the laser is controlled in such a way that the recesses, of the first type of recess and of the second type of recess, substantially have a point-like and/or groove-like structure and taper in a direction of deeper into the body.

11. The method as claimed in claim 7, wherein the depth of the second type of recess is 10 times as great/deep as the depth of the first type of recess.

12. The method as claimed in claim 1, wherein the laser is directed and guided onto the surface in such a way that it substantially does not create any preferential direction and/or regular pattern of the recesses.

13. The method as claimed in claim 1, wherein a material of the surface of the body comprises round and/or substantially spherical filler bodies.

* * * * *